(12) United States Patent
Knorr et al.

(10) Patent No.: US 7,887,865 B2
(45) Date of Patent: Feb. 15, 2011

(54) PEPPER BOAT MAKER AND PROCESS FOR MAKING SAME

(75) Inventors: Robert J. Knorr, Maricopa, AZ (US); John Victor, Cochise, AZ (US)

(73) Assignee: Knorr Technologies, L.L.C., Maricopa, AZ (US)

( * ) Notice: Subject to any disclaimer, the term of this patent is extended or adjusted under 35 U.S.C. 154(b) by 476 days.

(21) Appl. No.: 12/104,343

(22) Filed: Apr. 16, 2008

(65) Prior Publication Data

US 2009/0022865 A1 Jan. 22, 2009

Related U.S. Application Data

(60) Provisional application No. 60/912,400, filed on Apr. 17, 2007.

(51) Int. Cl.
*A23P 1/00* (2006.01)
(52) U.S. Cl. ............... 426/484; 426/518; 99/563; 99/547; 99/548
(58) Field of Classification Search .......... 426/484, 426/518; 99/563, 547, 548
See application file for complete search history.

(56) References Cited

U.S. PATENT DOCUMENTS

| 1,941,874 | A | 1/1934 | Bem |
| 2,649,880 | A | 8/1953 | Ewald |
| 2,703,126 | A | 3/1955 | Amori |
| 3,099,303 | A | 7/1963 | Anderson |
| 4,337,693 | A | 7/1982 | Dandrea |
| 5,168,801 | A | 12/1992 | Switek, Jr. |
| 5,787,801 | A | 8/1998 | Kirk |
| 6,770,313 | B2 | 8/2004 | Shim et al. |
| 2006/0083828 | A1* | 4/2006 | Lena et al. ............... 426/242 |
| 2007/0081415 | A1 | 4/2007 | Harewood |

FOREIGN PATENT DOCUMENTS

| JP | 10-14752 | * | 1/1998 |
| JP | 2006-158920 | * | 6/2006 |

* cited by examiner

*Primary Examiner*—Anthony Weier
(74) *Attorney, Agent, or Firm*—Paul B. Heynssens Attorney at Law, PLC

(57) ABSTRACT

The present example provides an automated or mechanized, way of making a pepper boat from a de-stemmed pepper. In making the pepper boat, de-stemmed peppers may be split by a splitting assembly. As the pepper is split, or subsequently, a whisk assembly tends to clean a portion of the veins and seeds from the split pepper pod to form two substantially equal halves of a pepper boat, suitable for further food processing.

16 Claims, 4 Drawing Sheets

PEPPER BOAT MAKER AND PROCESS FOR MAKING SAME

TECHNICAL FIELD

This description relates generally to food harvesting and processing and more specifically to the harvesting and processing of fruits and vegetables having veins and/or seeds, such as peppers.

BACKGROUND

Processing of peppers (and many other crops) is typically labor intensive. When peppers are processed, processing is often done by hand, often after the peppers have been shipped to a place where the cost of labor is low. Likewise, pepper boat making is a labor intensive process to split the pepper and remove a portion of the seeds and veins of a de-stemmed pepper, typically made from a whole pepper pod. Boat making is typically done before the peppers are processed into food products, such as jalapeno appetizers.

A trend in the agriculture industry is a decrease in the availability of seasonal laborers. This decrease in the availability of labor can create challenges to a grower's ability to harvest and process peppers. In addition, processing may be outsourced to foreign countries where labor may be available at low cost, but adding transportation costs to the total cost of processing.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein, in a simplified form as a prelude to the more detailed description that is presented later.

The present example provides a mechanized way of making a pepper boat, or longitudinally halved pepper, from a de-stemmed pepper. In making the pepper boat, de-stemmed peppers may be split longitudinally in substantially equal halves by a splitting assembly. As the pepper is split, or subsequently, a whisk assembly tends to clean a portion of the veins and seeds from the split pepper pod to form two halves of a pepper boat, suitable for further food processing.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings, is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a pepper boat maker. Although the present examples are described and illustrated herein as being implemented in a pepper de-stemming system, the system described is provided as an example and not a limitation. As those skilled in the art will appreciate, the present examples are suitable for application in a variety of different types of food processing or harvesting systems.

Figure 1:
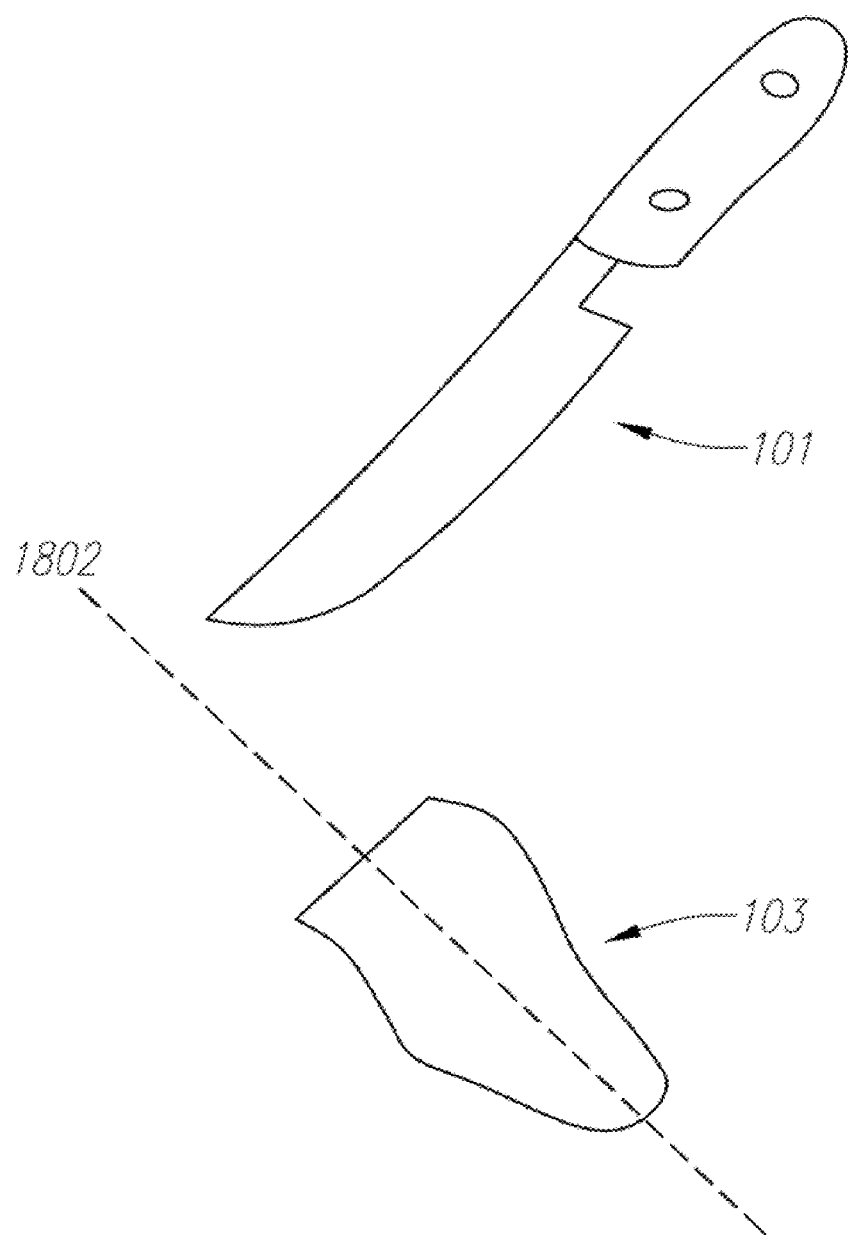
FIG. 1 shows conventional pepper boat making.

FIG. 1 shows conventional pepper boat making. Processing a pepper into a boat is typically a labor intensive process. A person typically uses a knife 101 to split a pepper 103 along a longitudinal line 1802. The person making the boat then typically uses the knife or other device to scoop out the seeds and/or veins from the two halves the pepper left after it split. The operator typically does this one pepper at a time. Such a process is hand labor intensive and is typically slow as the operator has to handle and process each pepper individually.

Figure 2:
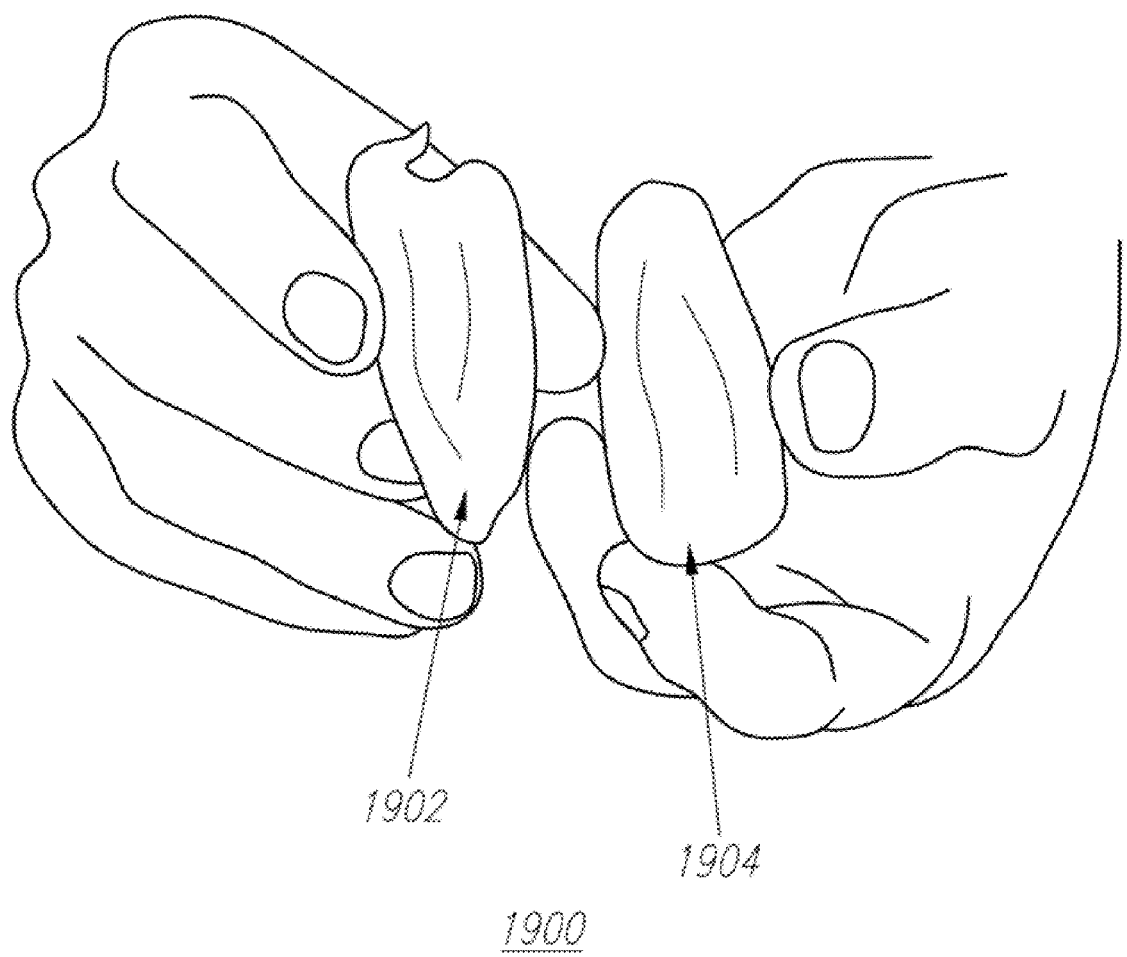
FIG. 2 shows two pepper boats made from a pepper.

FIG. 2 shows two pepper boats 1900 made from a de-stemmed pepper. The pepper boat maker typically produces two pepper boats 1900 suitable for further processing into Jalapeno poppers or other food products. As shown, a pepper is split into a first half 1902 and a second half 1904. Both halves of the pepper 1902, 1904 are relatively free of seeds and veins. The boats are typically made from a de-stemmed pepper that has been processed to remove the stem and cap in a previous process. However, the boat maker may also be used to make boats out of peppers that have not been de-stemmed.

Figure 3:
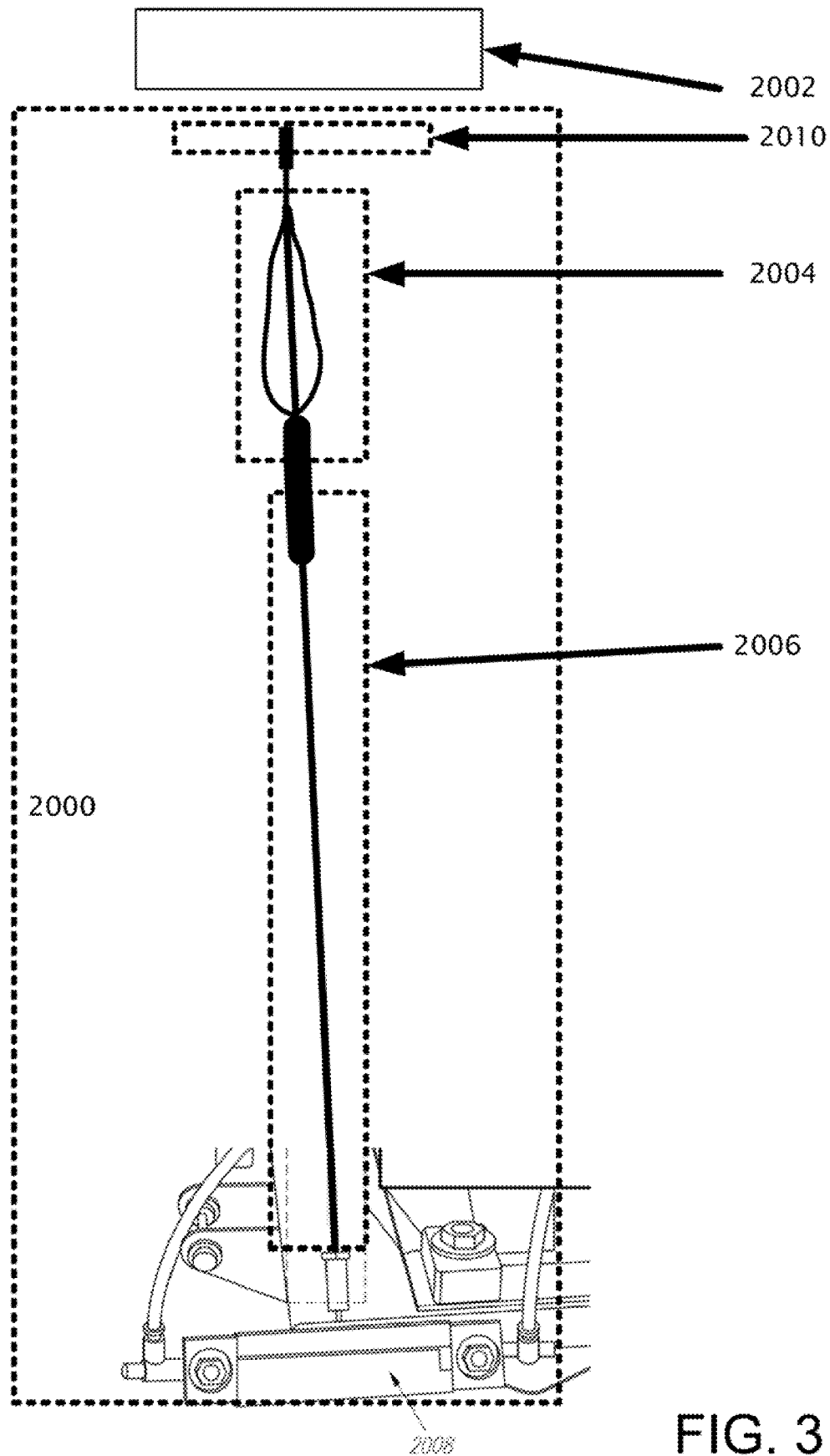
FIG. 3 shows a front view of a pepper boat maker as an integral processing module.

FIG. 3 shows a front view of a pepper boat maker 2000 installed as an integral processing module 1904. A boat maker 2000 typically provides two functions. First, it splits the pepper longitudinally in two substantially equal halves. And second, it removes the seeds from the pepper. The pepper is typically split by forcing it through a fixed blade or splitting assembly 2010 to render it into two halves. Almost immediately thereafter, a whisk-like assembly 2004 that spins about on an axis that is in line with the longitudinal axis of the pepper may be used to remove the seeds and veins. A drive shaft assembly 2006 driver that which one end of the whisk assembly may be fixed to the trailing edge, or back end, of the splitting blade and the other end of the whisk assembly is coupled to a drive mechanism 2008 to turn it.

The drive mechanism 2008 may rotate in one direction or it may rotate back and forth to remove the seeds. In one example, a pneumatically operated whisk assembly 2004 rotates back and forth in approximately 270° degrees of travel, and is air operated. The wire whisk assembly 2004 is typically flexible enough so that the pepper is not damaged (internal cell structure) as the wires conform to the interior of the pepper as it removes the seeds and veins.

Block 2002 shows a previous processing module used to process a pepper. A typical processing module may be one that destems the pepper.

Figure 4:
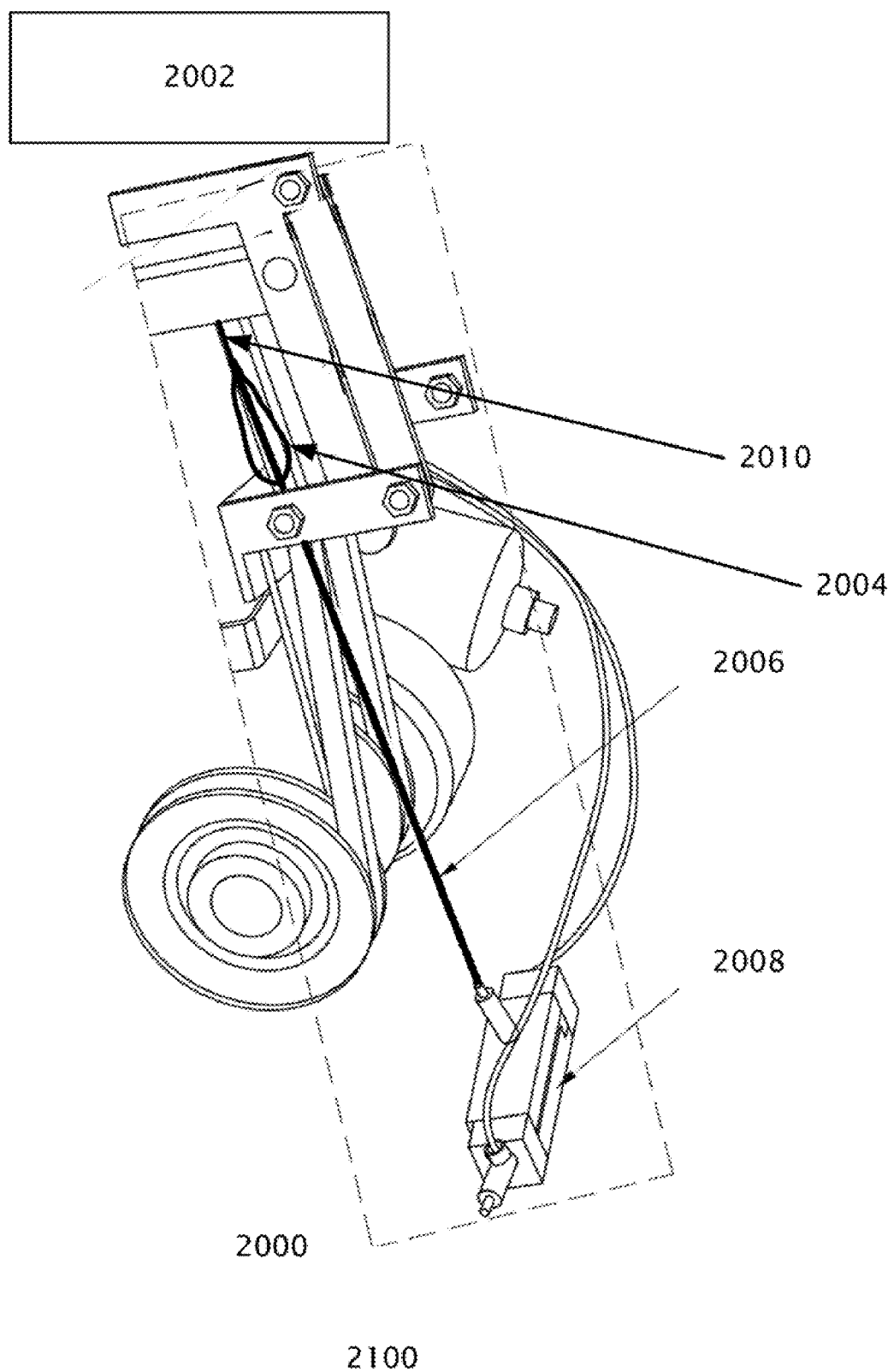
FIG. 4 shows a side view of a pepper boat maker as an integral processing module.

FIG. 4 shows a side view 2100 of a pepper boat maker 2000 as an integral processing module 1904. Prior pepper processing, such as de-stemming, typically occurs in the previously indicated processing module 2002. Next, the boat making module 2000 splits the pepper and removes the seeds. First, a splitting assembly 2010 splits the pepper into two halves and almost simultaneously feeds it into the whisk assembly 2004. As the pepper is being split, the whisk rotates about the inside of the pepper halves that are being divided to remove the seeds and veins. The shape of the whisk assembly, is narrower on the initial contact with the pepper and wider at the opposite end. This shape tends to aid in the removal of seeds and stems as the pepper halves diverge from each other as they immerge from the splitting assembly 2010. A drive shaft 2006 or an equivalent drive mechanism turns the whisk assembly so that it contacts the interior of the pepper to remove the seeds and veins. The drive shaft may be any suitable length. A drive mechanism 2008 supplied by air, rotates the shaft assembly and the whisk assembly coupled to the drive shaft. The drive mechanism may rotate continuously in one direction, or it may rotate back and forth to remove seeds and veins. Seed and vein removal and their separation from boat may be accomplished by various methods including water, air gravity and density.

The invention claimed is:

1. A pepper boat maker comprising:
    a knife blade disposed after a de-stemmer, for longitudinally slicing a de-stemmed pepper in half by forces produced by ejection of the de-stemmed pepper from the de-stemmer to form a first pepper half a and a second pepper half and
    a reciprocating whisk assembly disposed after the knife blade for removing seeds and veins from the first pepper half and the second pepper half as the first pepper half and the second pepper half are propelled past the reciprocating whisk assembly.

2. The pepper boat maker of claim 1, further comprising a guide mechanism to hold the first pepper half and the second pepper half against the reciprocating whisk assembly.

3. The pepper boat maker of claim 1, in which the guide mechanism includes a plurality of belts to propel and guide the de-stemmed pepper.

4. The pepper boat maker of claim 1, in which the first pepper half and the second pepper half form a first pepper boat and a second pepper boat for processing.

5. The pepper boat maker of claim 1, in which the de-stemmed pepper is a jalapeno pepper.

6. The pepper boat maker of claim 1, in which the de-stemmed pepper includes a body with seeds having a cap and a stem removed in a de-stemming process.

7. The pepper boat maker of claim 1, in which the first pepper half and the second pepper half are substantially equal in size.

8. The pepper boat maker of claim 1, in which the knife blade is fixed.

9. The pepper boat maker of claim 1, in which the reciprocating whisk assembly includes a longitudinal shaft to couple reciprocating motion to the whisk assembly.

10. The pepper boat maker of claim 1, in which reciprocating motion is provided by pneumatic force.

11. The pepper boat maker of claim 1, where the reciprocating whisk assembly is constructed of flexible material.

12. The pepper boat maker of claim 1, where the reciprocating whisk assembly is narrower where first the de-stemmed pepper first contacts it.

13. The pepper boat maker of claim 1, where the drive shaft rotates continuously in one direction.

14. A process for making pepper boats comprising:
    feeding a de-stemmed pepper into a fixed knife blade;
    splitting the de-stemmed pepper longitudinally into two halves with the fixed knife blade; and
    passing the halves past a rotating whisk assembly to remove seeds and veins from the two halves.

15. The process for making pepper boats of claim 14, further comprising holding the two halves against the rotating whisk assembly as they pass the rotating whisk assembly.

16. A process for making pepper boats comprising:
    splitting a de-stemmed pepper having a plurality of seeds, and a plurality of veins, longitudinally into two halves when propelled by a forced past a fixed knife blade;
    removing a portion of the plurality of seeds with a whisk assembly as the two halves propelled by the force pass the whisk assembly; and
    removing a portion of the plurality of veins with the whisk assembly as the two halves propelled by the force pass the whisk assembly.

* * * * *